US012774662B2

(12) United States Patent
Lefebvre et al.

(10) Patent No.: US 12,774,662 B2
(45) Date of Patent: Oct. 27, 2026

(54) STRUCTURAL CASING FOR GAS TURBINE ENGINE AND METHOD FOR ADJUSTING TIP CLEARANCE IN A GAS TURBINE ENGINE

(71) Applicant: Pratt & Whitney Canada Corp., Longueuil (CA)

(72) Inventors: Guy Lefebvre, St. Bruno (CA); Remy Synnott, St. Jean sur Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 14 days.

(21) Appl. No.: 18/219,288

(22) Filed: Jul. 7, 2023

(65) Prior Publication Data

US 2025/0012200 A1 Jan. 9, 2025

(51) Int. Cl.

*F01D 11/14* (2006.01)
*F01D 25/24* (2006.01)
*F01D 25/28* (2006.01)

(52) U.S. Cl.

CPC .............. *F01D 11/14* (2013.01); *F01D 25/24* (2013.01); *F01D 25/28* (2013.01); *F05D 2230/64* (2013.01); *F05D 2260/31* (2013.01)

(58) Field of Classification Search

CPC ........ F01D 25/24; F01D 25/28; F01D 25/243; F01D 11/14; F05D 2230/64
See application file for complete search history.

(56) References Cited

U.S. PATENT DOCUMENTS 3,062,497 A 11/1962 Howes et al.
3,628,884 A 12/1971 Mierley, Sr.
3,841,787 A 10/1974 Scalzo
4,650,396 A * 3/1987 Schwarz ................ F01D 25/26 415/128
6,457,936 B1 * 10/2002 Leach ..................... F01D 25/26 415/138
6,672,831 B2 * 1/2004 Brandl .................... F01D 11/22 415/173.2
7,581,922 B1 * 9/2009 Morimoto ............. F01D 25/285 415/126
8,182,207 B2 * 5/2012 Ballard, Jr. ........... F01D 25/246 415/214.1
8,313,283 B2 * 11/2012 Morimoto ............. F01D 21/003 415/118

(Continued)

FOREIGN PATENT DOCUMENTS

JP 2004137939 A 5/2004
JP 3745727 B2 12/2005

OTHER PUBLICATIONS

Extended European Search Report corresponding to EP Application No. 24186611.0; Issue Date, Dec. 23, 2024, 13 pages.

*Primary Examiner* — Courtney D Heinle
*Assistant Examiner* — Cameron A Corday
(74) *Attorney, Agent, or Firm* — CANTOR COLBURN LLP

(57) ABSTRACT

An outer structural case of a turbine casing assembly, including: a plurality of threaded adjustment openings located about a periphery of the outer structural case, the plurality of threaded adjustment openings extending completely through the periphery of the outer structural case; and a plurality of threaded securement openings arranged orthogonally with respect to the plurality of adjustment openings.

8 Claims, 10 Drawing Sheets

(56) References Cited

U.S. PATENT DOCUMENTS

| | | | | |
|---|---|---|---|---|
| 8,870,533 | B2 * | 10/2014 | Casavant ................ | F01D 11/22 415/213.1 |
| 8,998,578 | B2 | 4/2015 | Rauch et al. | |
| 9,068,471 | B2 | 6/2015 | Klingels | |
| 10,408,226 | B2 | 9/2019 | Ottow et al. | |
| 2012/0099990 | A1 * | 4/2012 | Fretwell ................ | F01D 25/246 416/131 |
| 2013/0017082 | A1 | 1/2013 | Casavant | |
| 2018/0016943 | A1 * | 1/2018 | Lefebvre ............... | F01D 25/246 |

* cited by examiner

STRUCTURAL CASING FOR GAS TURBINE ENGINE AND METHOD FOR ADJUSTING TIP CLEARANCE IN A GAS TURBINE ENGINE

BACKGROUND

This disclosure relates to structures for use in gas turbine engines, and more particularly to a structure and method for adjusting a turbine blade tip clearance in a gas turbine engine.

During engine assembly, turbine blade tip clearance must be increased to adjust compensate for radial eccentricity. In some cases, parts have to be grinded during the assembly process in order to compensate for the radial eccentricity. This adds time and cost to the engine assembly process.

As such, it is desirable to provide a structural case that can provide the aforementioned turbine tip clearance without having to grind the related parts.

BRIEF DESCRIPTION

Disclosed is an outer structural case of a turbine casing assembly, including: a plurality of threaded adjustment openings located about a periphery of the outer structural case, the plurality of threaded adjustment openings extending completely through the periphery of the outer structural case; and a plurality of threaded securement openings arranged orthogonally with respect to the plurality of adjustment openings.

In addition to one or more of the features described above, or as an alternative to any of the foregoing embodiments, the plurality of threaded securement openings are located on an end surface of the outer structural case.

In addition to one or more of the features described above, or as an alternative to any of the foregoing embodiments, the outer structural case has a circular configuration and the plurality of threaded adjustment openings are orthogonally arranged with respect to a center axis of the outer structural case.

In addition to one or more of the features described above, or as an alternative to any of the foregoing embodiments, the plurality of threaded securement openings are located on an end surface of the outer structural case.

Also disclosed is a turbine casing assembly, including: an outer structural case, the outer structural case having a plurality of threaded adjustment openings located about a periphery of the outer structural case, the plurality of threaded adjustment openings extending completely through the periphery of the outer structural case and a plurality of threaded securement openings arranged orthogonally with respect to the plurality of adjustment openings; an adjustable housing located within the outer structural case; a plurality of adjustment members rotatably received within the plurality of threaded adjustment openings, a distal end of each one of the plurality of adjustment members making contact with the adjustable housing when the plurality of adjustment members are received within the plurality of threaded adjustment openings; at least one vane ring secured to the adjustable housing, a portion of the at least one vane ring having a circular surface; and a rotor having a plurality of turbine blades wherein a clearance between the circular surface and tips of the plurality of turbine blades is adjusted by rotational movement of the plurality of adjustment members when they are in contact with the adjustable housing.

In addition to one or more of the features described above, or as an alternative to any of the foregoing embodiments, the outer structural case further includes a plurality of threaded securement openings arranged orthogonally with respect to the plurality of threaded adjustment openings.

In addition to one or more of the features described above, or as an alternative to any of the foregoing embodiments, the plurality of threaded securement openings are located on an end surface of the outer structural case.

In addition to one or more of the features described above, or as an alternative to any of the foregoing embodiments, the outer structural case has a circular configuration and the plurality of threaded adjustment openings are orthogonally arranged with respect to a center axis of the outer structural case.

In addition to one or more of the features described above, or as an alternative to any of the foregoing embodiments, the at least one vane ring has at least one vane.

In addition to one or more of the features described above, or as an alternative to any of the foregoing embodiments, a plurality of securement bolts are received in the plurality of threaded securement openings in order to secure the adjustable housing to the outer structural case.

In addition to one or more of the features described above, or as an alternative to any of the foregoing embodiments, the plurality of securement bolts are inserted through openings in a flange of the adjustable housing in order to secure the adjustable housing to the outer structural case.

In addition to one or more of the features described above, or as an alternative to any of the foregoing embodiments, the flange is positioned adjacent to an end surface of the outer structural case when the adjustable housing is secured to the outer structural case.

In addition to one or more of the features described above, or as an alternative to any of the foregoing embodiments, the plurality of adjustment members are bolts.

In addition to one or more of the features described above, or as an alternative to any of the foregoing embodiments, the plurality of adjustment members are set screws.

Also disclosed is a method of setting a tip clearance in a turbine casing assembly, including: securing at least one vane ring to an adjustable housing of the turbine casing assembly, a portion of the at least one vane ring having a circular surface; positioning the adjustable housing within the an outer structural case of the turbine casing assembly; adjusting a location of the adjustable housing with respect to the outer structural case by rotating a plurality of adjustment members threadably received within a plurality of threaded adjustment openings located about a periphery of the outer structural case, the plurality of threaded adjustment openings extending completely through the periphery of the outer structural case, a distal end of each one of the plurality of adjustment members making contact with the adjustable housing when the plurality of adjustment members are received within the plurality of threaded adjustment openings; and securing the adjustable housing to the outer structural case by inserting a plurality of securement bolts into a plurality of threaded securement openings located within the outer structural case after the adjusting step, wherein the plurality of threaded securement openings arranged orthogonally with respect to the plurality of adjustment openings.

In addition to one or more of the features described above, or as an alternative to any of the foregoing embodiments, the plurality of securement bolts pass through openings in a flange of the adjustable housing, the flange being positioned adjacent to an end surface of the outer structural case when the adjustable housing is secured to the outer structural case.

In addition to one or more of the features described above, or as an alternative to any of the foregoing embodiments, the plurality of adjustment members are a plurality of adjustment bolts and the method further comprises the step of replacing the plurality of adjustment bolts with another plurality of adjustment bolts after the securing step, the another plurality of adjustment bolts having a shaft that is shorter than a shaft of the plurality of adjustment bolts.

In addition to one or more of the features described above, or as an alternative to any of the foregoing embodiments, the plurality of adjustment members are set screws.

In addition to one or more of the features described above, or as an alternative to any of the foregoing embodiments, further including the step of using an indicator tool to measure a tip clearance between the circular surface of the at least one vane ring and tips of a plurality of turbine blades rotatably received within the at least one vane ring.

In addition to one or more of the features described above, or as an alternative to any of the foregoing embodiments, the plurality of securement bolts pass through openings in a flange of the adjustable housing, the flange being positioned adjacent to an end surface of the outer structural case when the adjustable housing is secured to the outer structural case.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
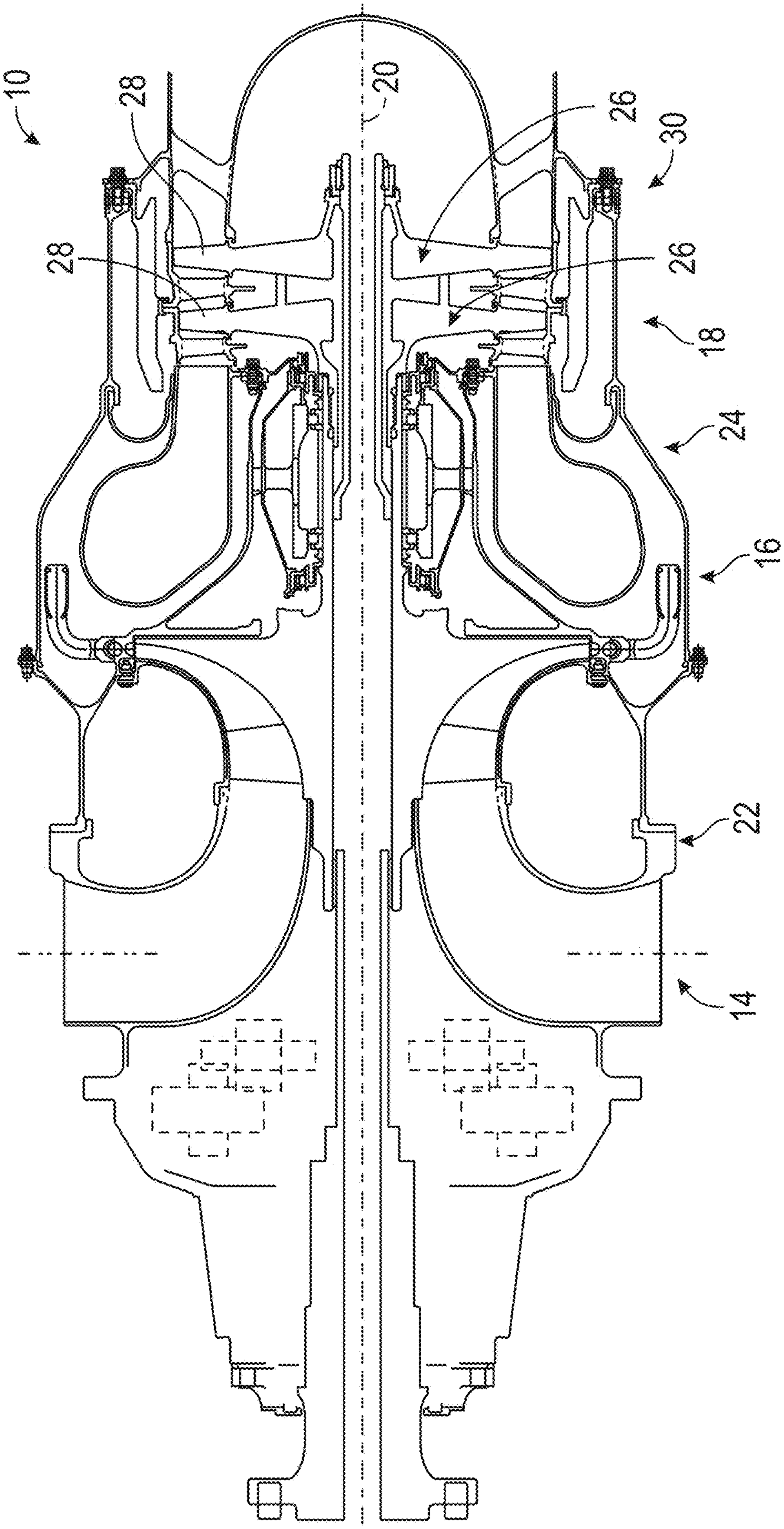
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Some of the rotatable components of the gas turbine engine 10 rotate about a longitudinal center axis 20 of the gas turbine engine 10.

The gas turbine engine 10 has a “cold” section 22 and a “hot” section 24. The cold section 22 includes those components of the gas turbine engine 10 which are upstream (relative to the direction gases flow through the gas turbine engine 10) of the combustor 16 and have thus not been exposed to the hot combustion gases. The hot section 24 includes the combustor 16 and those components of the gas turbine engine 10 which are downstream of the combustor 16. The components of the hot section 24 are thus exposed to the hot combustion gases generated in the combustor 16. The gases flowing through the cold section 22 have a lower temperature than the gases flowing through the hot section 24.

The hot section 24 includes the combustor 16, the turbine section 18 and a case downstream of the turbine section 18 for conveying the exhaust gases. The turbine section 18 includes one or more rotors 26 each having a plurality of rotor blades 28 which rotate about the center axis 20 and extract energy from the combustion gases. The rotors 26 and the rotor blades 28 of the turbine section 18 are typically referred to as turbines 26 and turbine blades 28, respectively. The hot section 24 includes stationary bodies which enclose other components of the hot section 24 and define the gas path for the hot combustion gases. These stationary bodies are sometimes referred to as casings or cases which collectively define radially-outer boundaries of the gas turbine engine.

Figure 2:
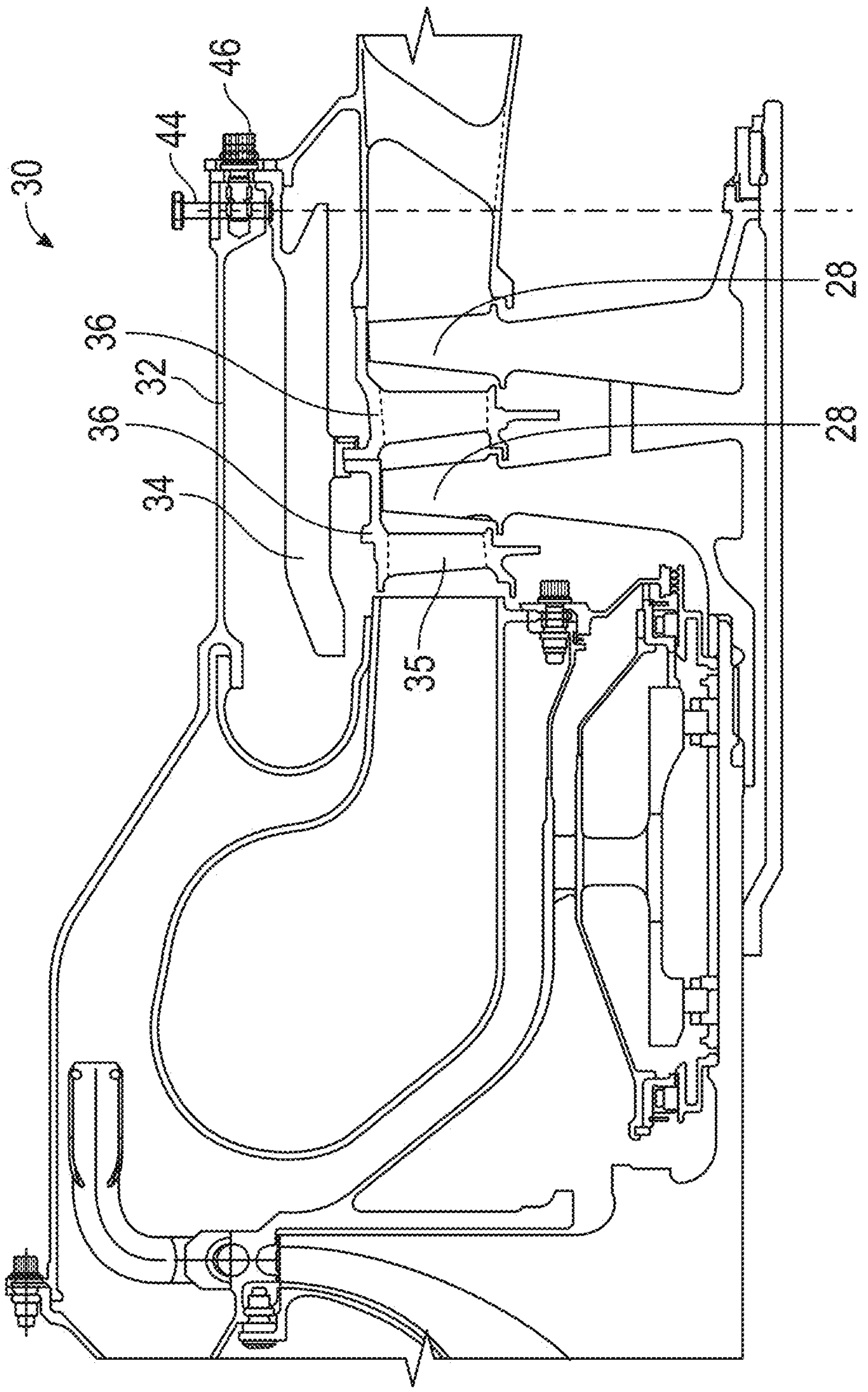
FIGS. 2 and 3 are enlarged views of portions of the gas turbine engine as illustrated in FIG. 1.
Figure 3:
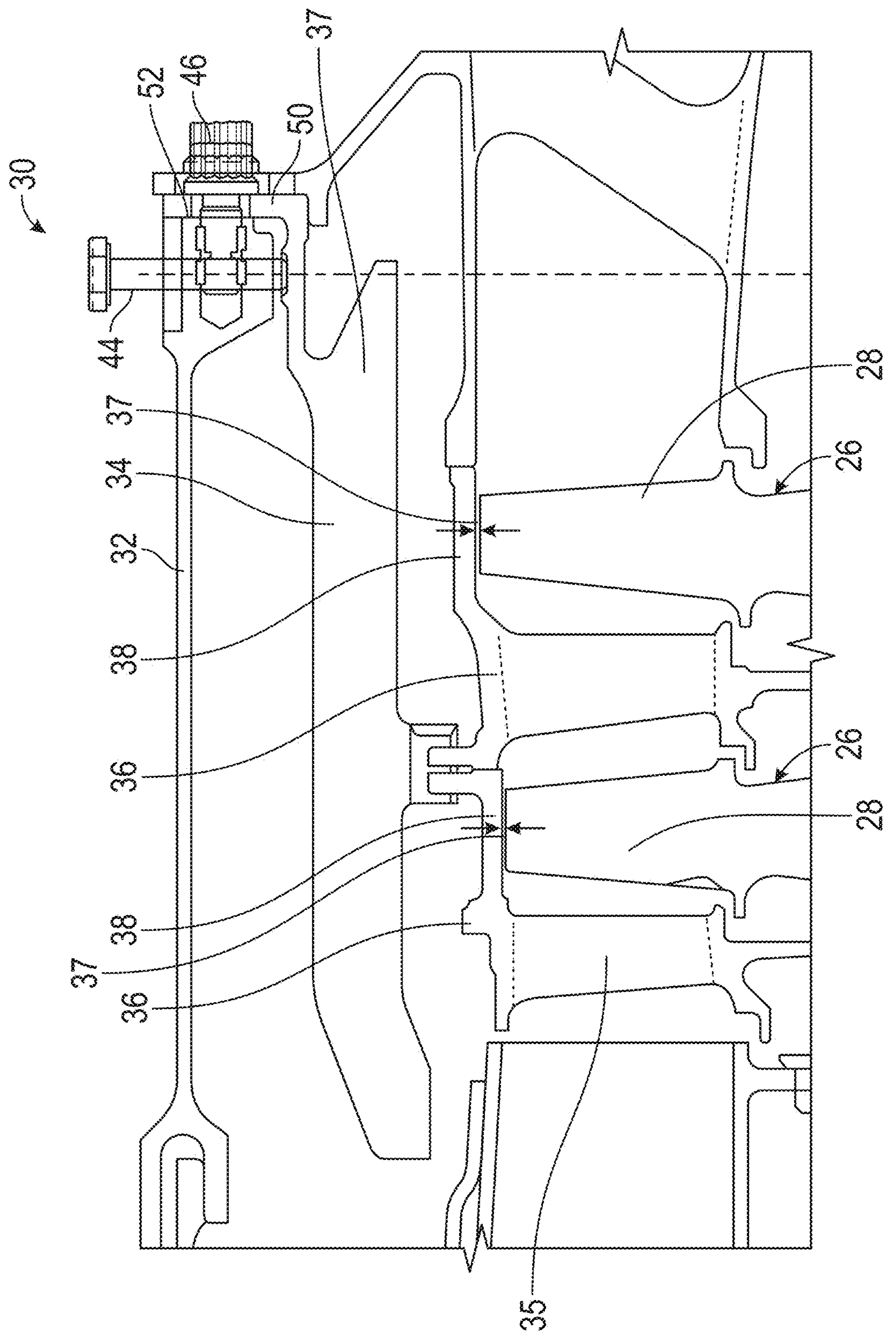
Figure 4:
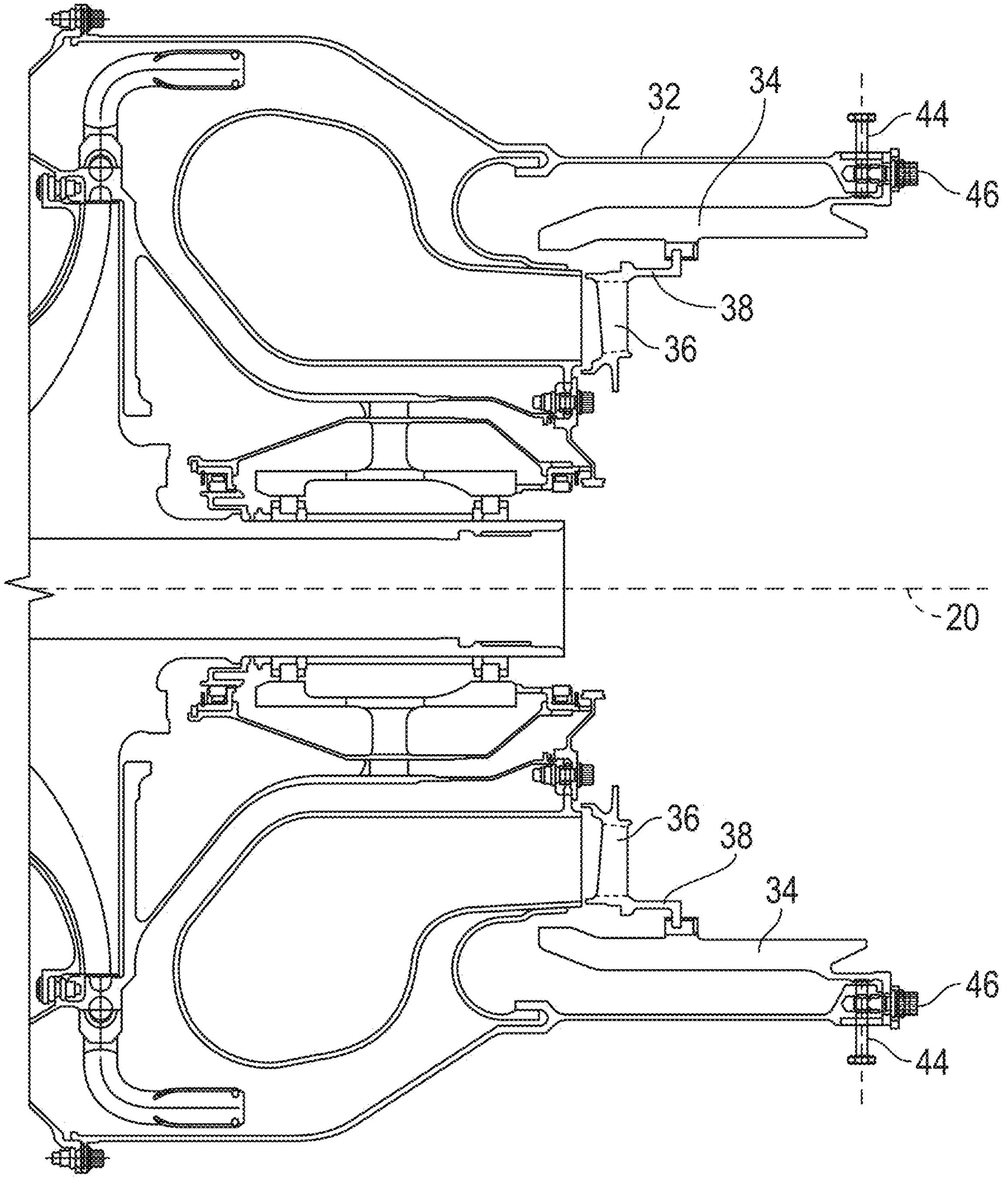
FIG. 4 is a cross-sectional view of a portion of the gas turbine engine illustrated in FIG. 1.
Figure 5:
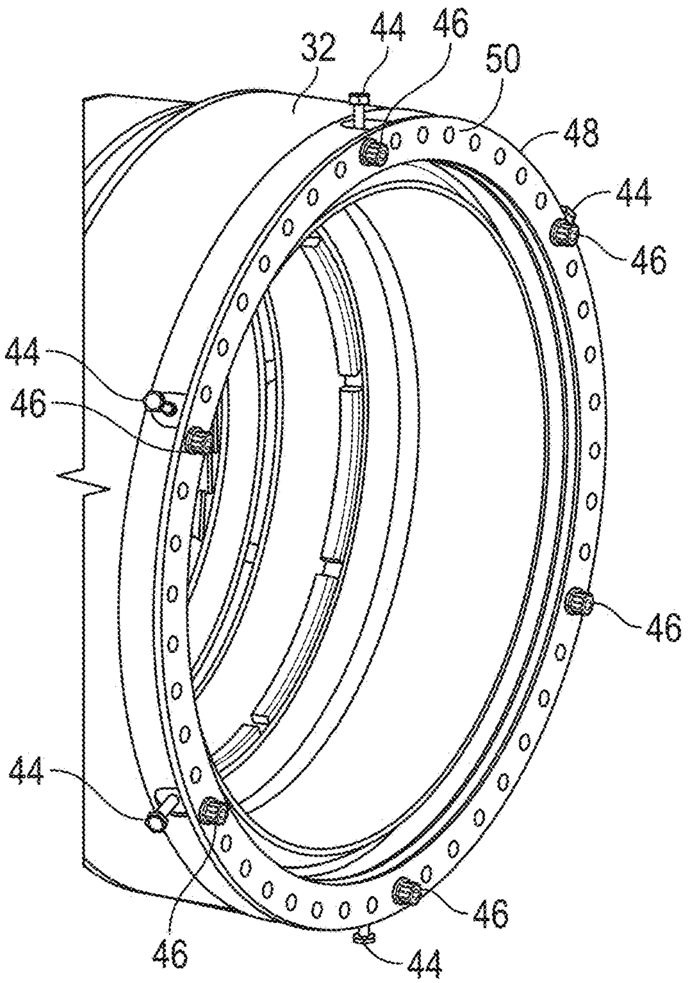
FIG. 5 is a perspective view of a portion of the gas turbine engine illustrated in FIG. 1.
Figure 6:
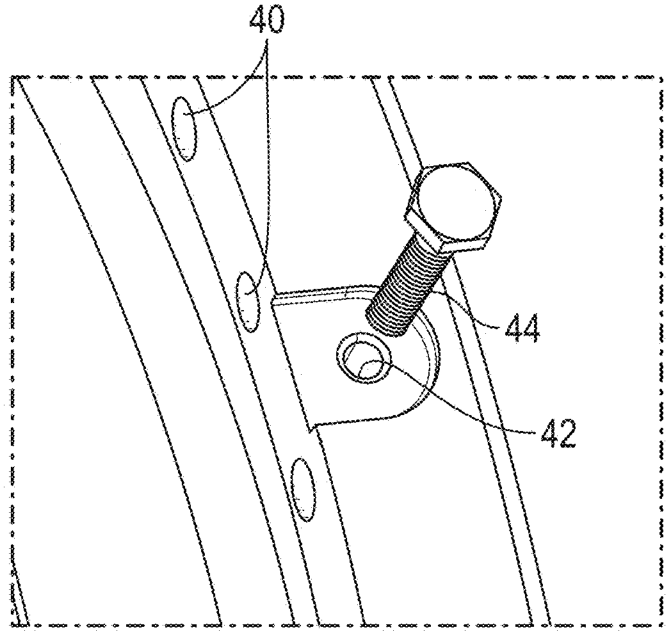
FIG. 6 illustrates a portion of the gas turbine illustrated in FIG. 1.
Figure 7:
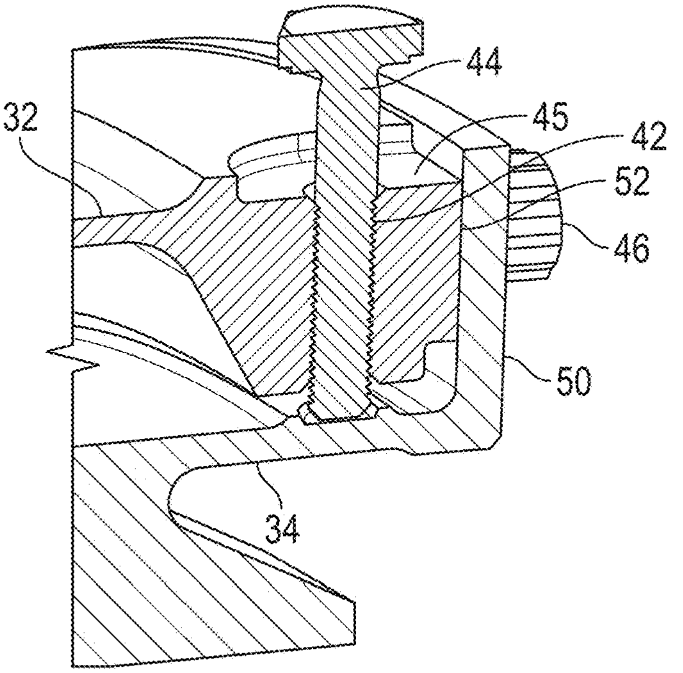
FIG. 7 is a perspective cross-sectional view of a portion of the gas turbine illustrated in FIG. 1.

Referring now to at least FIGS. 1-3, the casing of the gas turbine engine 10 includes a turbine casing assembly 30 which is part of the hot section 24. The turbine casing assembly 30 is a group of casing components that form part of the turbine section 18 and enclose the combustion gases. The turbine casing assembly 30 may be provided as disassembled components which may then be assembled in a suitable facility. The turbine casing assembly 30 includes an outer structural case 32, an adjustable housing 34, and at least one vane ring 36. The at least one vane ring 36 having at least one vane 35 secured thereto. In one embodiment, the least one vane ring 36 having the at least one vane 35 is formed as a single component. A portion 38 of the at least one vane ring 36 has a circular surface that defines a clearance or tip clearance 37 between a tip of the turbine blades 28 and the portion 38 of the at least one vane ring 36. In one embodiment, the outer structural case 32, the adjustable housing 34, and the least one vane ring 36 have circular portions or configurations.

The at least one vane ring 36 is secured to the adjustable housing 34 and the adjustable housing 34 is adjustable with respect to the outer structural case 32 before it is secured to the outer structural case 32. The outer structural case 32 has a plurality of securement openings 40 and a plurality of adjustment openings 42. The plurality of adjustment openings extending completely through a periphery of the outer structural case 32. The plurality of adjustment openings 42 are orthogonally positioned with respect to the plurality of securement openings 40. In addition, the plurality of adjustment openings 42 are also orthogonally positioned with respect to the engine axis 22. In one non-limiting embodiment, the plurality of adjustment openings 42 and the plurality of securement openings 40 are threaded openings. It being understood that the plurality of adjustment openings 42 and the plurality of securement openings 40 are offset from each other such that the plurality of adjustment openings 42 and the plurality of securement openings 40 do not intersect with each other. In order to relocate the at least one vane ring 36 with respect to the tips of the plurality of turbine blades 28 such that the tip clearance 37 is uniform and not eccentric with respect to the plurality of turbine blades 28, a plurality of adjustment members or bolts 44 are inserted into the plurality of adjustment openings 42 until they contact the adjustable housing 34.

The plurality of adjustment openings 42 are located about the engine axis 22 such that adjustment of their location with respect to the outer structural case 32 after they contact the adjustable housing 34 will relocate the adjustable housing 34 with respect to the engine axis 22 such that the at least one vane ring 36 can be repositioned with respect to the tips of the plurality turbine vanes 28. For example, once the adjustment bolts 44 make contact with the adjustable housing 34 further rotation in a first direction or clockwise direction will push the adjustable housing 34 further away from the outer structural case 32 or alternatively rotation of the adjustment bolt 44 in a second direction or counter clockwise direction will allow the adjustable housing 34 to be moved closed to the outer structural case 32 by for example, rotating other adjustment bolts 44 located on an opposite side of the engine axis 22 in the first direction or clockwise direction.

In one non limiting embodiment, the outer structural case 32 has flat surfaces 45 adjacent to the plurality of adjustment openings 42.

In one non-limiting embodiment, there are at least six adjustment openings 42 spaced equally about the engine axis 22. Of course, various embodiments of the present disclosure contemplate more or less than six adjustment openings 42.

Figure 11:
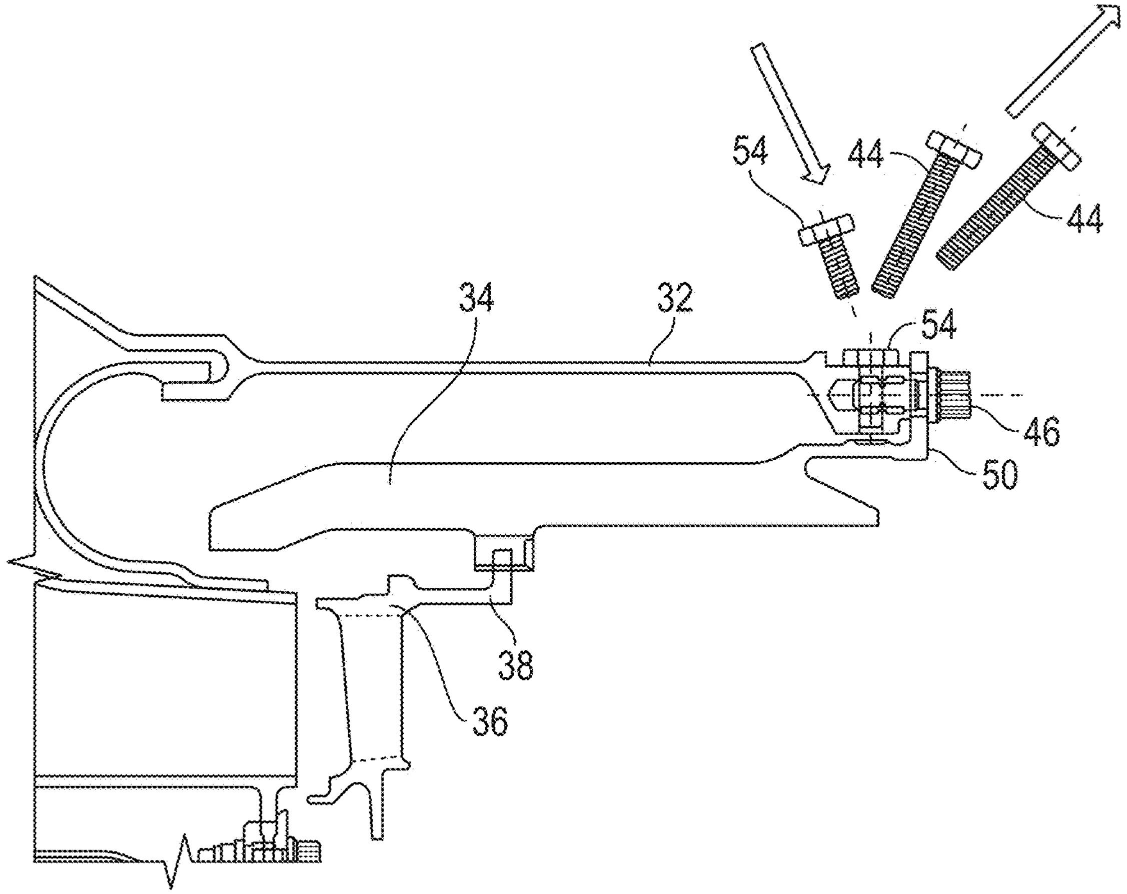
FIGS. 11-13B illustrate assembly of the adjustable housing to the outer structural case in accordance with the present disclosure.
Figure 12A:
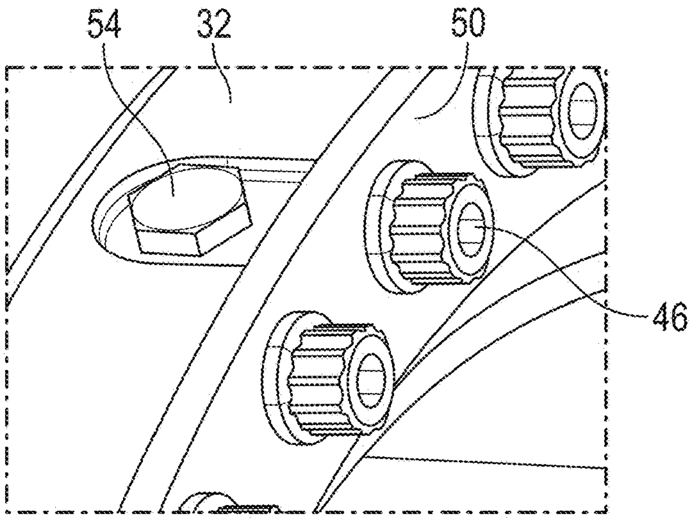
Figure 12:
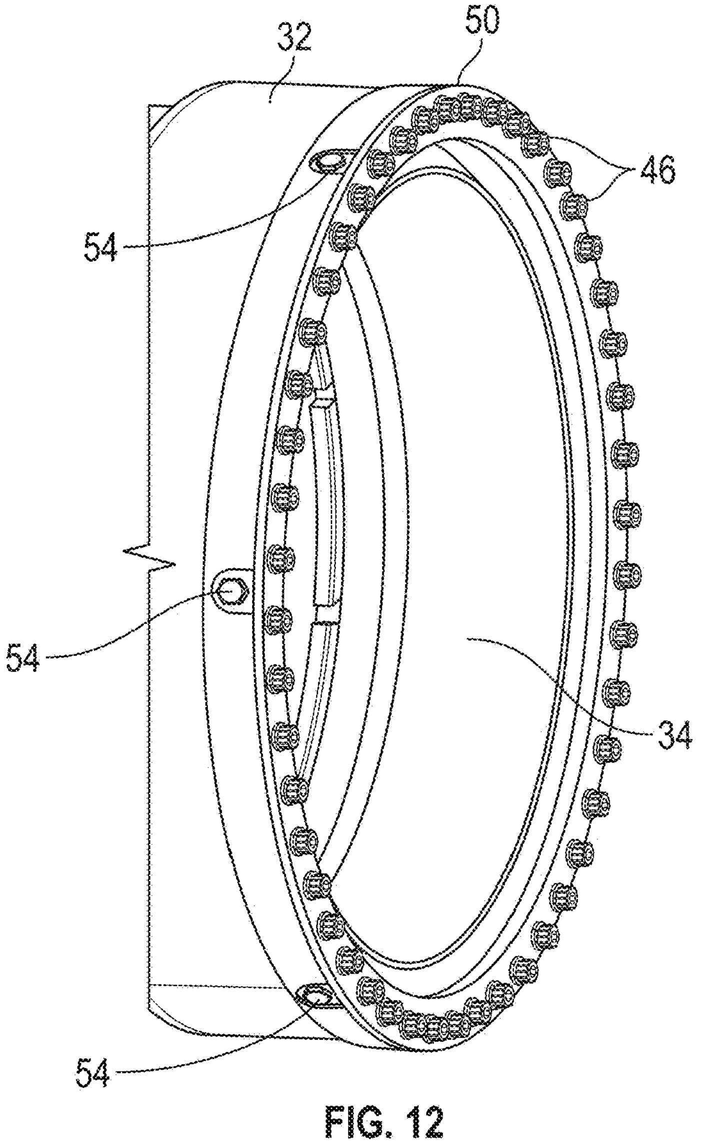
Figure 13B:
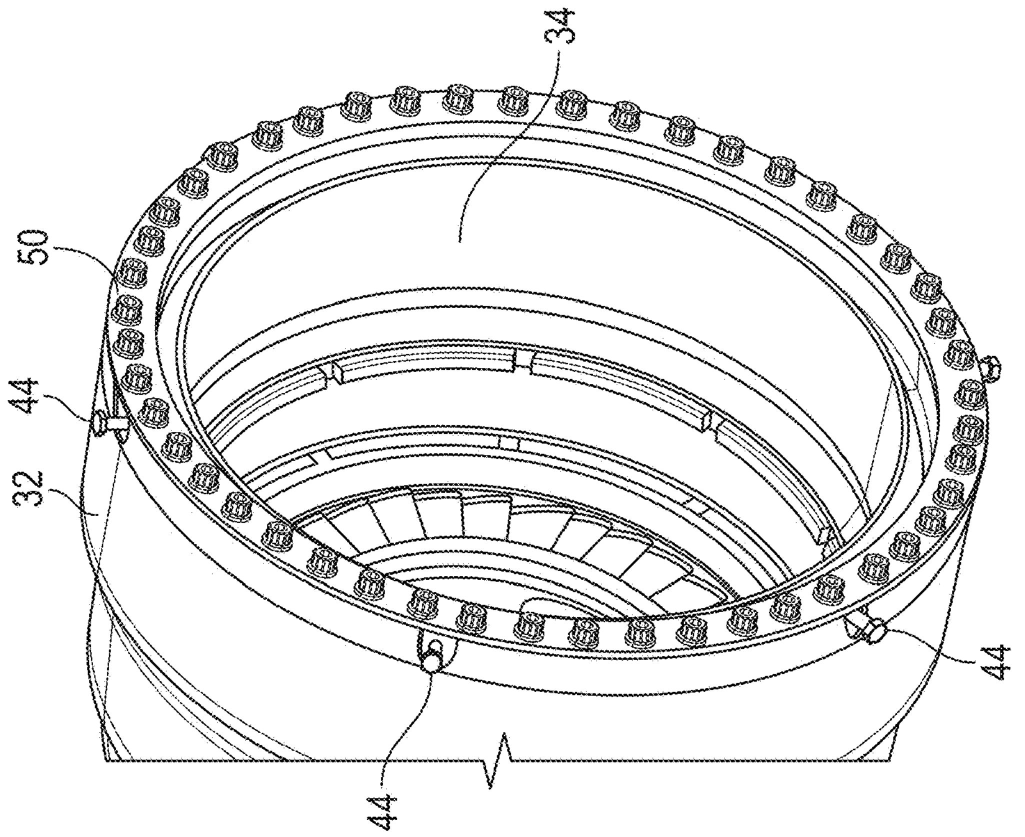
Figure 13A:
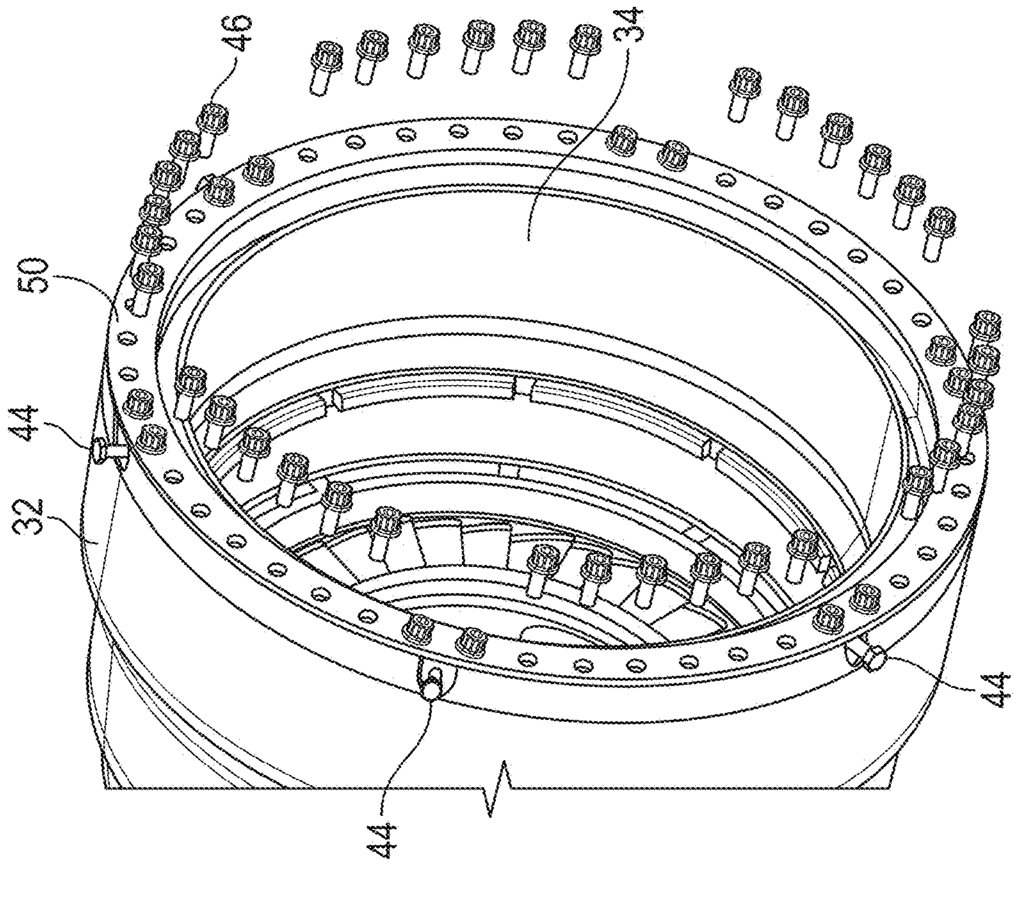

Once the adjustable housing 34 is positioned in a desired location with respect to the engine axis 22, a plurality of securement bolts 46 are inserted through openings 48 in a flange 50 of the adjustable housing 34 that is positioned adjacent to an end surface 52 of the outer structural case 32 that has the plurality of securement openings 40 located within the adjustable housing 34. Once the securement bolts 46 are received in the plurality of securement openings 40 the adjustable housing 34 is secured to the outer structural case 32. Thereafter, the plurality of adjustment bolts 44 may be removed and replaced with securement bolts 54 that have a shorter shaft so that they do not extend from the outer structural case 32. See at least FIGS. 11, 11A and 12.

Figure 8:
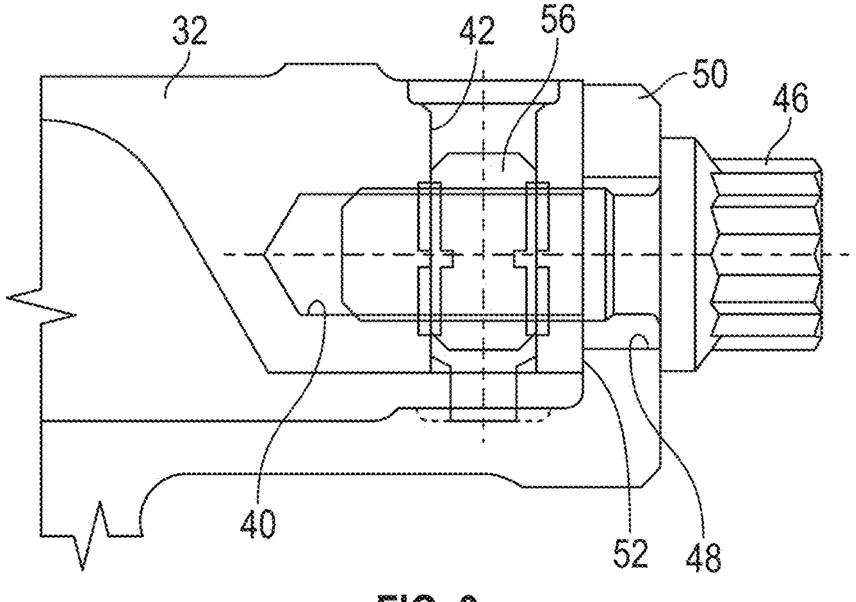
FIG. 8 is a cross-sectional view of a portion of the gas turbine illustrated in FIG. 1 in accordance with an alternative embodiment.
Figure 8A:
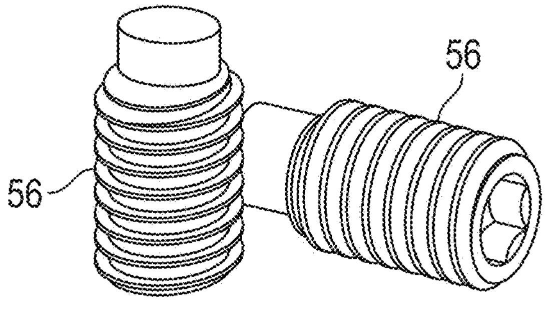
FIG. 8A illustrates set screws used in the embodiment illustrated in FIG. 8.
Figure 9:
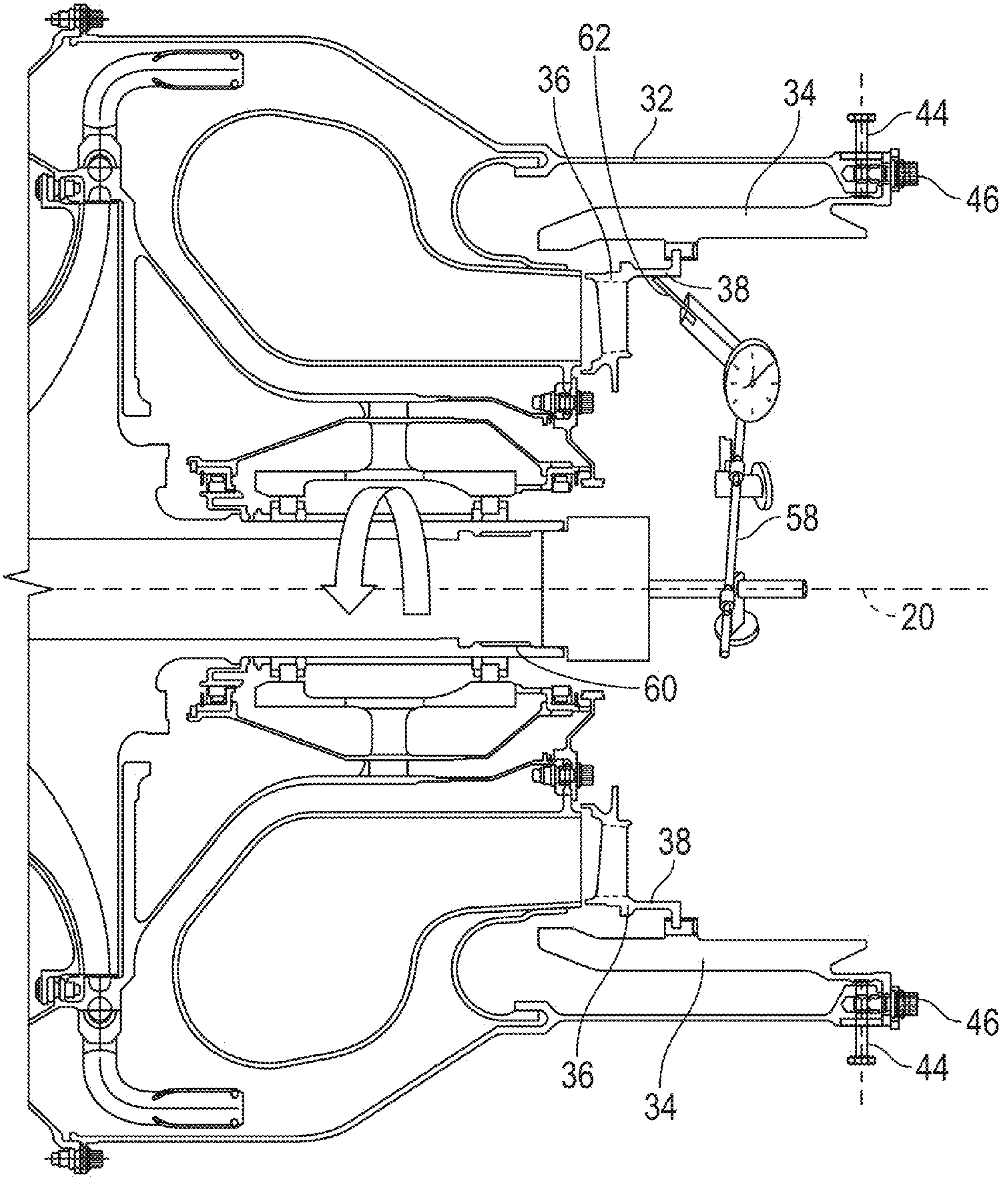
FIGS. 9 and 10 illustrate a method for adjusting a tip clearance or for removing any eccentricity from the tip clearance of a gas turbine engine.
Figure 10:
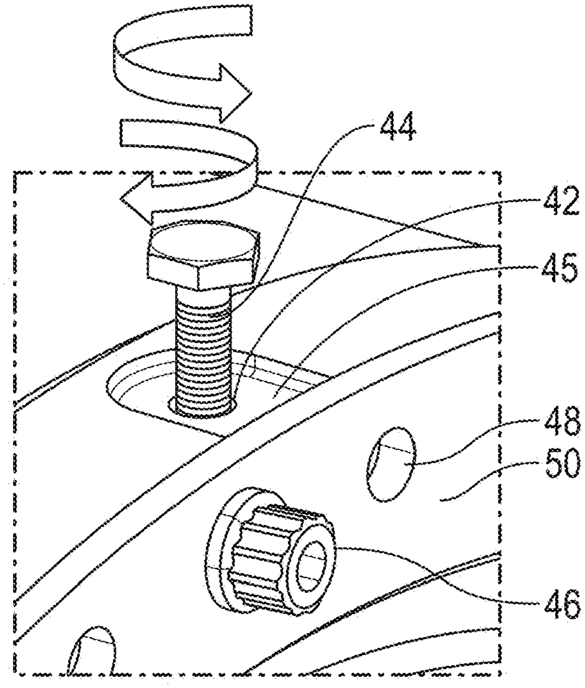

Referring now to at least FIGS. 8 and 8A and in an alternative embodiment, the plurality of adjustment members or bolts 44 may be replaced with set screws 56. The set screws 56 will be able to extend further into the plurality of adjustment openings 42 thereby negating the need to replace them with shorter securement bolts 54 once the adjustable housing 34 is positioned in the desired location with respect to the plurality of turbine blades 28.

Referring now to at least FIGS. 4-13B, the assembly procedure of the turbine casing assembly 30, is described. First, the at least one vane ring 36 is secured to the adjustable housing 34. Then the adjustable housing 34 with the at least one vane ring 36 is inserted within the outer structural case 32. Thereafter, the adjustment bolts 44 or the set screws 56 are threaded into the adjustment openings 42 until a distal end of the adjustment bolts 44 or the set screws 56 contacts the adjustable housing 34. It being understood that, an outer periphery of the adjustable housing 34 is slightly smaller than an inner periphery of the outer structural case 32 such that once the adjustment bolts 44 or the set screws 56 pass through the adjustment openings 42 the distal ends of the adjustment bolts 44 contact the adjustable housing 34.

Once this occurs, an indicator tool 58 is located on an end of a turbine shaft 60 at an interface of an inner bore of the of a disc of the turbine rotor 26. A dial indicator 62 of the indicator tool 58 is located against the diameter or tip of the turbine blade 28 that is to be used to control the tip clearance. Thereafter, the turbine shaft 60 is rotated to determine the eccentricity of the tip clearance of the turbine blade 28 with respect to the at least one vane ring 36. If an eccentric tip clearance is detected then adjustment bolts 44 or the set screws 56 are adjusted (e.g., rotated clockwise or counter clockwise in order to allow for movement of the adjustable housing 34 with respect to the outer structural case 32) to remove any eccentricity from the tip clearance. Once this has been completed, the turbine shaft 60 is again rotated to determine the eccentricity of the tip clearance of the turbine blade 28 with respect to the at least one vane ring 36. If an eccentric tip clearance is detected then adjustment bolts 44 or the set screws 56 are adjusted to remove any eccentricity from the tip clearance. If no eccentric tip clearance is detected, then the securement bolts 46 are received in the plurality of securement openings 40 and the adjustable housing 34 is secured to the outer structural case 32. See at least FIGS. 13A and 13B.

Thereafter and as mentioned above, the adjustment bolts 44 are removed and replaced with securement bolts 54 that have a shorter shaft unless set screws 56 are used.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine casing assembly, comprising:

an outer structural case, the outer structural case having a plurality of threaded adjustment openings located about a periphery of the outer structural case, the plurality of threaded adjustment openings extending completely through the periphery of the outer structural case and a plurality of threaded securement openings arranged orthogonally with respect to the plurality of adjustment openings;

an adjustable housing located within the outer structural case;

a plurality of bolts rotatably received within the plurality of threaded adjustment openings, a distal end of each one of the plurality of bolts making direct contact with the adjustable housing when the plurality of bolts are received within the plurality of threaded adjustment openings;

at least one vane ring secured to the adjustable housing, a portion of the at least one vane ring having a circular surface; and a rotor having a plurality of turbine blades wherein a clearance between the circular surface and tips of the plurality of turbine blades is adjusted by rotational movement of the plurality of bolts when they are in contact with the adjustable housing.

2. The turbine casing assembly as in claim 1, wherein the plurality of threaded securement openings are located on an end surface of the outer structural case.

3. The turbine casing assembly as in claim 1, wherein the outer structural case has a circular configuration and the plurality of threaded adjustment openings are orthogonally arranged with respect to a center axis of the outer structural case.

4. The turbine casing assembly as in claim 1, wherein the at least one vane ring has at least one vane.

5. The turbine casing assembly as in claim 1, wherein a plurality of securement bolts are received in the plurality of threaded securement openings in order to secure the adjustable housing to the outer structural case.

6. The turbine casing assembly as in claim 5, wherein the plurality of securement bolts are inserted through openings in a flange of the adjustable housing in order to secure the adjustable housing to the outer structural case.

7. The turbine casing assembly as in claim 6, wherein the flange is positioned adjacent to an end surface of the outer structural case when the adjustable housing is secured to the outer structural case.

8. The turbine casing assembly as in claim 1, wherein the plurality of adjustment members are set screws.

* * * * *